Aug. 10, 1943.   E. C. HORTON   2,326,357
MOTOR VEHICLE CONSTRUCTION
Filed Aug. 17, 1939
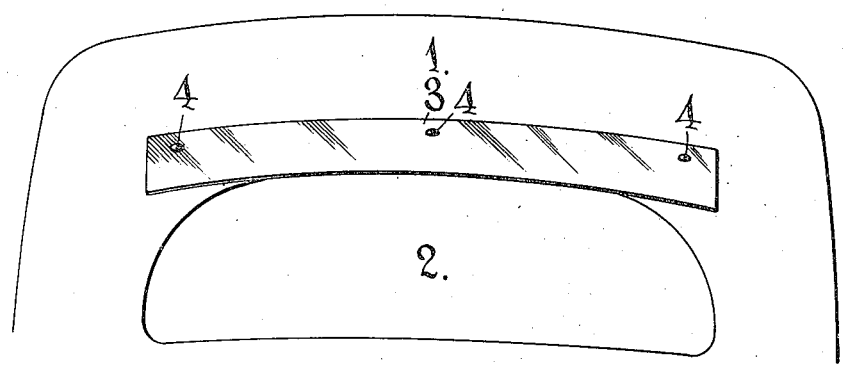
Fig.1.
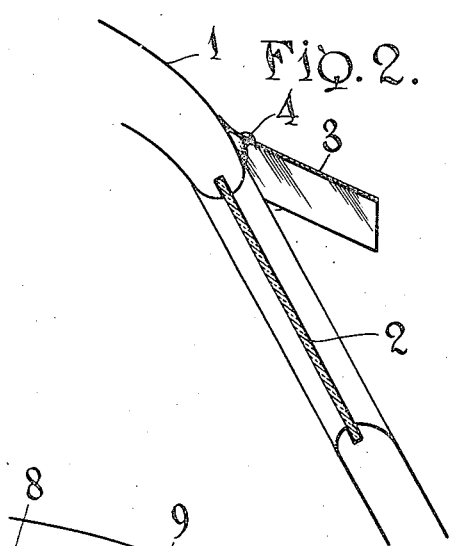
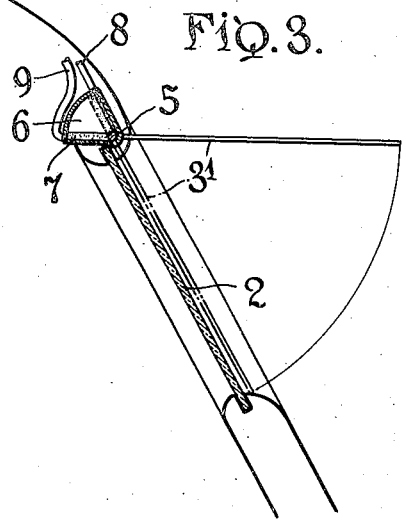
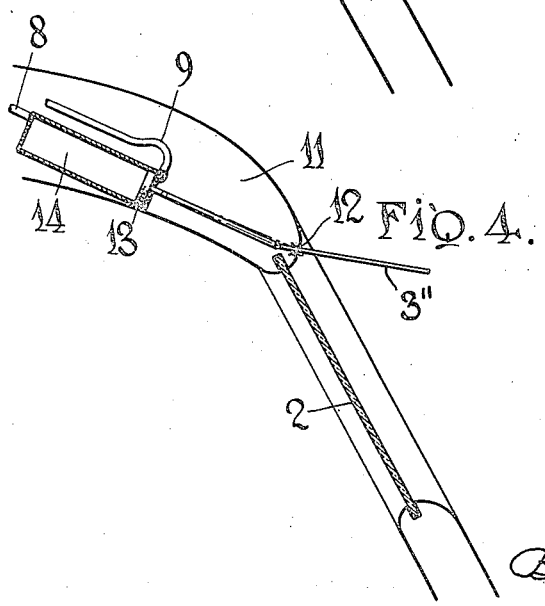
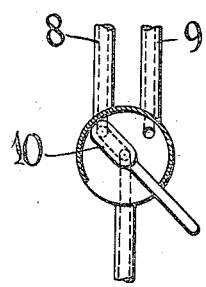
INVENTOR
Erwin C. Horton,
BY
Beau, Brooks, Buckley & Beau.
ATTORNEYS Patented Aug. 10, 1943

2,326,357

UNITED STATES PATENT OFFICE 2,326,357

MOTOR VEHICLE CONSTRUCTION

Erwin C. Horton, Hamburg, N. Y., assignor to Trico Products Corporation, Buffalo, N. Y.

Application August 17, 1939, Serial No. 290,650

5 Claims. (Cl. 296—95)

This invention relates to a motor vehicle construction and primarily to the rear body formation of the present day streamline passenger automobile in which the rear window is disposed at a marked angle from the perpendicular. By reason of the sloping window snow and other vision obscuring matter will accumulate thereon and dim or entirely block out vision therethrough.

The present invention has for its primary object to provide a shielding construction by which the window may be maintained free of snow, dust and the like, and thereby enable the driver to clearly view the traffic conditions when he looks into his rear view mirror.

The invention further has for its object to provide a practical shielding arrangement for the rear window which will be practical and not, by its presence, obscure light passing through the window itself.

In the accompanying drawing:

Fig. 1 is a rear elevation of a motor vehicle illustrating one embodiment of the present invention;

Fig. 2 is an enlarged sectional view through the sloping rear window more clearly disclosing the mounting of the weather shield;

Figs. 3 and 4 are fragmentary sectional views showing modified embodiments of the present invention; and Fig. 5 is a detailed sectional view of a control valve employed in the modified showings.

Referring more particularly to the accompanying drawing the numeral 1 designates the body of an automobile of streamline design having the forward and rearward portions sloping in accordance with the present day trend. This streamlined design for automobiles disposes the rear window 2 at quite an angle from the vertical so that when the automobile is parked during a snow storm the snow will accumulate thereon completely obscuring vision therethrough so that when the motorist resumes his trip he is inconvenienced by the beclouding snow which prevents rear viewing of traffic conditions.

In the simplest form of the present invention a shield body 3 is mounted above the window to extend rearwardly therefrom in canopy fashion so that the falling snow will lodge thereupon instead of falling directly upon the window. The body 3 is preferably transparent so as to pass light into the interior of the vehicle under normal conditions, and may be of any suitable material, such as a flexible sheet of celluloid which may be bowed transversely or otherwise shaped to the upper edge of the window for better protecting the latter from snow deposit. The free lower or outer edge of the shield will preferably stop short of the horizontal plane of the upper edge of the window to avoid projecting into the field of rear vision but will extend rearwardly at least to the vertical plane of the lower edge of the window, as depicted in Fig. 2, for greatest efficiency.

The shield may be adjustably mounted, as by means of a plurality of suction cups 4, and when this mode of mounting is used the cups may be arranged to provide a tripod support for imparting to the shield body a curvature in accordance with the curved upper edge of the window. If desired, the snow shield 3 may be incorporated in the construction of the vehicle body to form a permanent part thereof, as shown in Figs. 3 and 4.

Referring particularly to Fig. 3, the snow shield 3' is normally disposed in parallelism with the window and through which the traffic conditions to the rear may be viewed. For this purpose the shield may be clear glass, and by means of a pivotal support 5 the shield may be swung upwardly out of the field of vision when any vision obscuring matter has accumulated thereon. This movement of the shield may be effected by suitable means accessible to the motorist, such as a fluid motor chamber 6 located at the window and having a vane piston 7 therein fixed on the pivotal shaft 5. Fluid lines 8 and 9 open into the chamber at opposite sides of the vane and are selectively connected by a valve 10 to a source of fluid pressure, such as the intake manifold of the motor vehicle power plant. This control valve 10 is conveniently located in an accessible position, such as on the instrument panel of the vehicle.

In Fig. 4, the snow shield 3" is slidably projectable from a concealed position within a compartment 11 of the body structure overhanging the window. The shield operates through a guiding slot 12 in the window frame and may be projected by a piston 13 slidable in a motor chamber 14.

From the foregoing it will be observed that the rear window is protected against the accumulation of snow or other falling and vision obscuring matter, that the usual field of vision through the rear window is maintained clear without restricting the scope or field; and that the snow shield is disposed in the path of the air flow over the vehicle to be swept free of any clouding matter by the air flow over the vehicle. The shield, while serving to protect the rear window against vision obscuring matter will, nevertheless, enable the light to enter the rear window in the usual manner when the shield is of transparent material. The shield may be of opaque, colored or translucent material if desired, to modify and guard against the direct incidence of the sun's rays upon the window. The shield is mounted for adjustment and may be regulated to the greatest efficiency.

The foregoing description is merely illustrative of the inventive concept employed which may partake of other physical embodiments without departing from the spirit of the invention or the scope claimed.

What is claimed is:

1. A visor for rear windows of vehicles, comprising a rigid hood-like structure positioned over the window and forming part of the inclined rear body panel of the vehicle, the visor being coextensive with the rear window and overlying substantially the entire area thereof, but extending practically horizontally in a rearward direction, thereby allowing unobstructed vision through the window and toward the rear.

2. A visor for rear windows of vehicles, comprising a rigid hood-like structure positioned over the window and merging into the inclined rear body panel of the vehicle, the visor being coextensive with the rear window and overlying substantially the entire area thereof, but extending practically horizontally in a rearward direction, thereby allowing unobstructed vision through the window and toward the rear.

3. A visor for the rear window in the inclined rear body panel of a streamlined vehicle, comprising a rigid hood-like structure positioned over the rear window to catch falling matter which would otherwise fall on the window when the vehicle is standing, the visor being coextensive with the rear window and overlying substantially the entire area thereof, but extending practically horizontally in a rearward direction and at an angle to the inclined panel, thereby allowing unobstructed vision through the window to the rear at all times while disposing the visor to be swept by the airstream during vehicular travel clear of any fallen matter.

4. A visor for the sloping rear windows of streamlined motor vehicles, comprising a rigid hood-like structure positioned over the window and forming part of the inclined rear body panel of the vehicle, the visor being coextensive with that portion of the rear window which constitutes the field of vision for observing traffic conditions to the rear and overlying substantially the entire area of such field portion, but extending practically horizontally in a rearward direction, thereby allowing unobstructed vision through such field portion of the window and toward the rear.

5. A visor for the sloping rear windows of streamlined motor vehicles, comprising a rigid hood-like structure positioned over the window and forming part of the inclined rear body panel of the vehicle, the visor being coextensive with that portion of the rear window which constitutes the field of vision for observing traffic conditions to the rear and overlying substantially the entire area of such field portion, but extending practically horizontally in a rearward direction, thereby allowing unobstructed vision through such field portion of the window and toward the rear, and means for moving the visor to and from its operative position in which such field portion of the window is maintained clear for such unobstructed vision therethrough.

ERWIN C. HORTON.